(12) United States Patent
G S (10) Patent No.: US 11,948,131 B2
(45) Date of Patent: Apr. 2, 2024

(54) SYSTEM AND METHOD FOR DEVICE TRANSACTION AUTHORIZATION

(71) Applicant: Visa International Service Association, San Francisco, CA (US)

(72) Inventor: Nithyaraj G S, Erode (IN)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 2 days.

(21) Appl. No.: 17/684,512

(22) Filed: Mar. 2, 2022

(65) Prior Publication Data

US 2023/0281576 A1  Sep. 7, 2023

(51) Int. Cl.
| | | |
|---|---|---|
| *G06Q 20/02* | (2012.01) | |
| *G06Q 20/30* | (2012.01) | |
| *G06Q 20/40* | (2012.01) | |

(52) U.S. Cl.
CPC ........... *G06Q 20/02* (2013.01); *G06Q 20/308* (2020.05); *G06Q 20/401* (2013.01)

(58) Field of Classification Search
None
See application file for complete search history.

(56) References Cited

U.S. PATENT DOCUMENTS

| | | | |
|---|---|---|---|
| 10,158,480 B1* | 12/2018 | Winklevoss | .......... H04L 9/3247 |
| 10,218,697 B2 | 2/2019 | Cockerill et al. | |
| 10,230,710 B2 | 3/2019 | Wang | |
| 10,231,122 B2 | 3/2019 | Childress et al. | |
| 10,921,787 B1* | 2/2021 | Kursun | ................. H04L 63/102 |
| 10,990,894 B2* | 4/2021 | Shaashua | ................ G06F 16/35 |
| 11,140,159 B2 | 10/2021 | Wang | |
| 11,341,485 B2* | 5/2022 | Kursun | .............. G06Q 20/3672 |
| 2018/0025356 A1 | 1/2018 | Maheshwari et al. | |
| 2021/0150018 A1 | 5/2021 | Paaredi et al. | |
| 2022/0092575 A1* | 3/2022 | Zheng | .................. G06Q 20/308 |
| 2022/0394033 A1* | 12/2022 | Akkapeddi | ............. H04L 63/10 |

* cited by examiner

*Primary Examiner* — Paul S Schwarzenberg
(74) *Attorney, Agent, or Firm* — Buckley Patent Law LLC/VISA; Timothy Emmanuel Buckley (57) ABSTRACT

A computer-implemented method includes registering a user device and an internet-of-things (IOT) device for use in a transaction-by-proxy service; collecting behavior-related data associated with a user of the user device and the first IOT device; and using the behavior-related data as part of the transaction-by-proxy service to generate a transaction-by-proxy at the IOT device on behalf of the user of the user device. The computer-implemented method further includes generating a transaction-by-proxy model using the behavior-related data associated with the user and training the transaction-by-proxy model to determine whether to request the transaction-by-proxy.

16 Claims, 7 Drawing Sheets

SYSTEM AND METHOD FOR DEVICE TRANSACTION AUTHORIZATION

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

As users of payment systems become increasingly busy and distracted in their day-to-day activities, there is often not enough time to make mundane purchases or conduct monotonous financial transactions with banking institutions. In addition, trusting other individuals to conduct financial transactions on behalf of the users can lead to identity theft and fraud, which has become more common in online financial transactions. As a result, trust has been broken between the users of payment systems and the individuals and institutions entrusted to perform the transactions. Therefore, a need exists to enable users of payment systems to have personalized financial transactions occur without wasting valuable time and energy.

DETAILED DESCRIPTION

FIGS. 1-7 illustrate systems and techniques configured to allow a user of a user device to utilize an internet-of-thing (IOT) device to make a transaction-by-proxy on behalf of the user of the user device. In some embodiments, a transaction-by-proxy is a transaction requested by an electronic representative of the user, such as, an IOT device, that does not require direct approval from a user for performance, but instead utilizes behavior of the user to generate and authorize the transaction. In some embodiments, the IOT device utilizes a transaction-by-proxy model generated based on behavior-related patterns of the user for initiation and verification of the transaction-by-proxy. In some embodiments, the transaction-by-proxy generated using the transaction-by-proxy model allows IOT devices to make transactions, such as, for example, purchases of merchandise or services, on behalf of the user. The transaction-by-proxy service described herein is an improvement over existing systems in that the transaction-by-proxy service eliminates the need for user 105 to directly request and approve a transaction, instead, the transaction-by-proxy service requests and approves the transaction, thereby making the process of making financial transactions more efficient.

As used herein, the term "account data," refers to any data concerning one or more accounts for one or more users. Account data may include, for example, one or more account identifiers, user identifiers, transaction histories, balances, credit limits, issuer institution identifiers, and/or the like.

As used herein, the term "account identifier" may include one or more types of identifiers associated with a user account (e.g., a PAN, a primary account number, a card number, a payment card number, a token, and/or the like). In some non-limiting embodiments, an issuer institution may provide an account identifier (e.g., a PAN, a token, and/or the like) to a user that uniquely identifies one or more accounts associated with that user. The account identifier may be embodied on a payment device (e.g., a portable payment instrument, a payment card, a credit card, a debit card, and/or the like) and/or may be electronic information communicated to the user that the user may use for electronic payments. In some non-limiting embodiments, the account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet, and/or the like) that includes data. It will be appreciated that numerous other arrangements are possible.

As used herein, the term "computing device" or "communication device" or "user device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer. As used herein, the term "user interface" or "graphical user interface" refers to a generated display, such as one or more graphical user interfaces (GUIs) with which a user may interact, either directly or indirectly (e.g., through a keyboard, mouse, touchscreen, etc.).

An "Internet of Things device" may be an example of a "computer device." An Internet of Things device may have a primary function that is related to or unrelated to communicating with other Internet of Things devices or computers. For example, an Internet of Things device may be a refrigerator that, in addition to preserving food, is capable of interacting with one or more other Internet of Things devices. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

As used herein, the term "issuer" or "issuer institution" or "issuer host" may refer to one or more entities, such as a bank, that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a payment device, such as a physical financial instrument, e.g., a payment card, and/or may be electronic and used for electronic payments. In some embodiments, the term "issuer system" refers to one or more computer systems operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. As used herein, the term "merchant system" may refer to one or more computer systems operated by or on behalf of a merchant, such as a server computer executing one or more software applications.

As used herein, the term "point-of-sale (POS) system," may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "payment device" may refer to a payment card (e.g., a credit or debit card), a gift card, a smartcard, smart media, a payroll card, a healthcare card, a wristband, a machine-readable medium containing account data, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of payment devices managed by a transaction service provider. As used herein, the term "payment gateway system" may refer to one or more computer systems, computer devices, servers, groups of servers, and/or the like operated by or on behalf of a payment gateway.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

Figure 1:
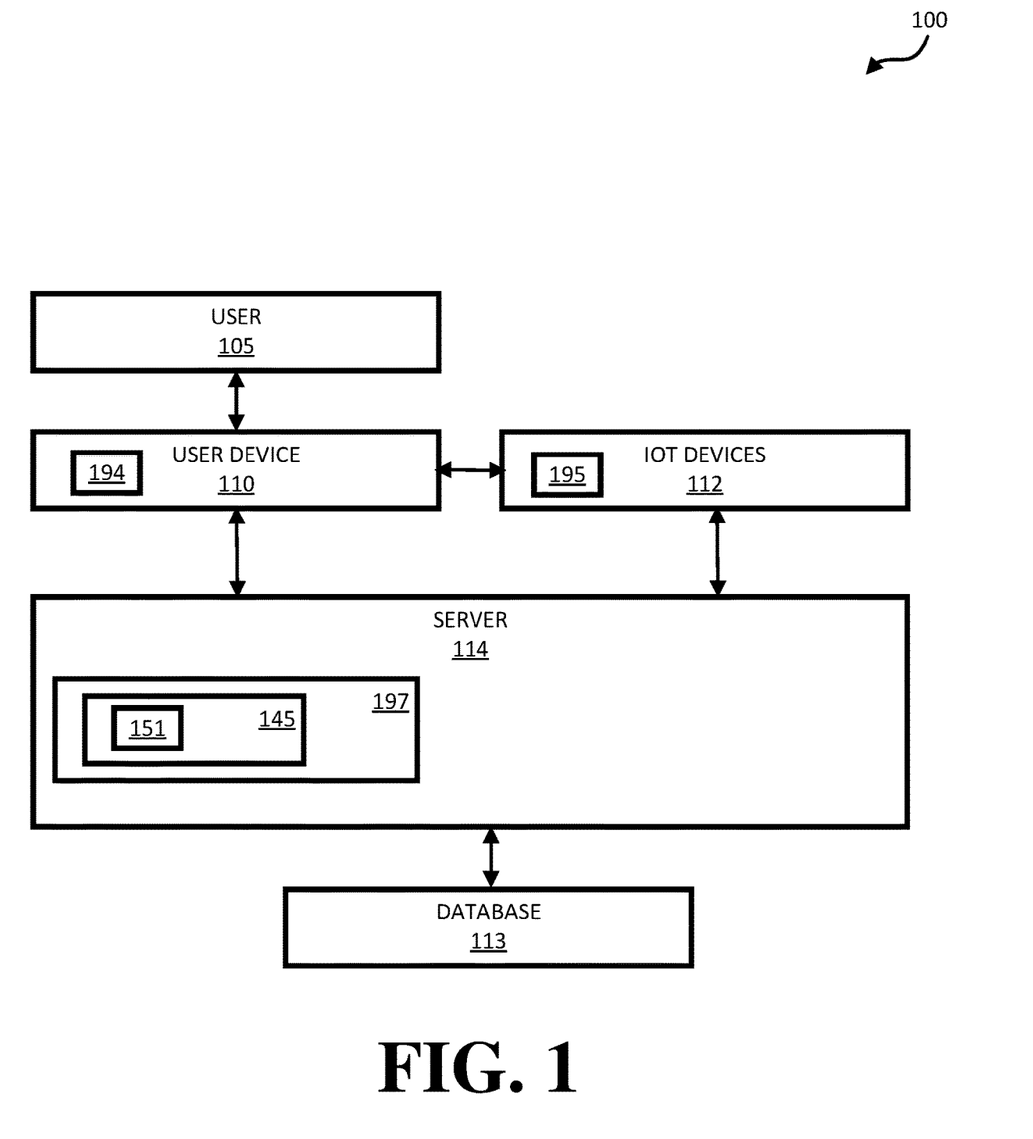
FIG. 1 is a block diagram illustrating a system for generating a transaction-by-proxy in a transaction-by-proxy service in accordance with some embodiments.

FIG. 1 illustrates a system 100 in accordance with some embodiments. In some embodiments, the system 100 includes a user device 110, internet-of-things devices (IOT) devices 112, a server 114, and a database 113. The system 100 generates a transaction-by-proxy model 151 that is utilized by user device 110 and/or IOT devices 112 to generate a transaction-by-proxy in a transaction-by-proxy service provided for user 105. In some embodiments, the transaction-by-proxy service is configured to allow user device 110 and/or IOT devices 112 to make transactions (e.g., financial transactions, service transactions, etc.) on behalf of user 105 without the need for user 105 to directly request or approve the transactions. Instead, behavior-related data corresponding to user 105 is used to request and/or approve the transactions and generate transactions that originate from user device 110 and/or IOT devices 112. As a result, the transaction-by-proxy generated utilizing the transaction-by-proxy service may be used by user device 110 and/or MT devices 112 to order products or services from a merchant or service provider on behalf of user 105.

In some embodiments, user 105 initiates the transaction-by-proxy service by installing transaction-by-proxy application 194 onto user device 110. In some embodiments, the transaction-by-proxy application 194 is installed from a transaction-by-proxy unit 197 located on server 114. In some embodiments, the transaction-by-proxy unit 197 is software located server 114 that manages transaction-by-proxy application. 194 and transaction-by-proxy application 195 in order to generate the transaction-by-proxy output by, for example, user device 110 and/or each IOT device of IOT devices 112. In some embodiments, transaction-by-proxy application 194 is application software installed on user device 110 that, in addition to collecting behavior-related data associated with user 105, serves as an access hub for user 105 to utilize the transaction-by-proxy service. In some embodiments, users of the transaction-by-proxy application 194 are able to access and control the transaction-by-proxy services using the transaction-by-proxy application 194.

In some embodiments, after the transaction-by-proxy application 194 is installed onto user device 110, user 105 registers user device 110 and IOT devices 112 with transaction-by-proxy unit 197 of server 114. In some embodiments, registration of the devices may include providing a device identifier and/or application programming interfaces (API) identifier for each device and communicating the identifier to transaction-by-proxy application 194 and server 114. In some embodiments, registration of the devices may include registering user device 110 as a control device and IOT devices 112 as non-control devices with transaction-by-proxy unit 197 of server 114 using the transaction-by-proxy application 194. In some embodiments, an IOT device of IOT devices 112 may be registered as a control device and the user device 110 may be registered as a non-control device. In some embodiments, by registering user device 110 as a control device, user device 110 is configured to control the IOT devices 112 that are used to provide the transaction-by-proxy service from a central transaction-by-proxy location. In some embodiments, by registering IOT devices 112 as non-control devices, the IOT devices 112 operate at the direction of user device 110 even though the IOT devices 112 are configured to generate the transaction-by-proxy without direct verification and authorization from user 105. For example, in some embodiments, because user device 110 is a control device and IOT devices 112 are non-control devices, user device 110 is able to turn-on, turn-off, activate, and deactivate, the transaction-by-proxy service that is provided using the IOT devices 112 at the request of user 105.

In some embodiments, as part of the registration process, transaction-by-proxy application 195 is installed from server 114 onto each registered IOT device of IOT devices 112. In some embodiments, transaction-by-proxy application 195 is application software configured to collect behavior-related data associated with user 105 and the IOT devices 112 and generate the transaction-by-proxy based on a transaction-by-proxy behavior analysis of the behavior-related data. In some embodiments, transaction-by-proxy application 195 is application software configured to collect behavior-related data associated only with user 105 and generate the transaction-by-proxy based on a transaction-by-proxy behavior analysis of the behavior-related data. In some embodiments, the behavior-related data collected by IOT devices 112 and user device 110 may include, for example, the purchasing habits of user 105, the listening habits of user 105, the viewing habits of user 105, the exercise habits of user 105, and the driving habits of user 105. In some embodiments, the behavior-related purchasing habits of user 105 may be used to, for example, purchase products habitually purchased by user 105 using the specific user device 110 or IOT device 112. In some embodiments, the listening habits of user 105 may be used to, purchase music, podcasts habitually listened to by user 105. In some embodiments, the exercise habits of user 105 may be used to purchase, for example, exercise gear, exercise services (e.g., services provided from an exercise trainer), or exercise equipment that are habitually used by user 105 during routine exercises. In some embodiments, the driving habits of user 105 are used to purchase, for example, tires, oil change services, or other driving related products or services related to the driving habits of user 105.

In some embodiments, after the transaction-by-proxy application 195 is installed onto IOT devices 112 and transaction-by-proxy application 194 is installed onto user device 110, both the transaction-by-proxy application 194 and transaction-by-proxy application 195 commence the process of collecting the behavior-related data associated with user 105. In some embodiments, only the transaction-by-proxy application 194 commences the process of collecting the behavior-related data associated with user 105. In some embodiments, as the behavior-related data is being collected, the collected behavior-related data is stored in database 113. In some embodiments, the behavior-related data is subsequently provided to a transaction-by-proxy model generation unit 145 in server 114 for generation of a transaction-by-proxy model 151 using the transaction-by-proxy analysis.

In some embodiments, the transaction-by-proxy model generation unit 145 is software configured to utilize an artificial intelligence platform and machine learning techniques during the transaction-by-proxy analysis to generate transaction-by-proxy model 151 by analyzing the user behavior-related data. In some embodiments, the transaction-by-proxy model 151 is a machine learning model that is configured learn patterns of the behavior-related data of user 105. In some embodiments, the transaction-by-proxy model 151 may be, for example, a binary classification model that is configured to generate transaction-by-proxy predictions by finding the patterns in the behavior-related data (described in further detail with reference to FIG. 2).

In some embodiments, the transaction-by-proxy model generation unit 145 receives the behavior-related data from IOT devices 112 and/or user device 110 and commences the process of conducting the transaction-by-proxy analysis to generate the transaction-by-proxy model used by IOT devices 112 and user device 110 to generate the transactionby-proxy. In some embodiments, the transaction-by-proxy model 151 generated by transaction-by-proxy model generation unit 145 is provided to IOT devices 112 and/or user device 110 in order to generate transactions-by-proxy on behalf of user 105 (described further herein with reference to FIG. 2).

Figure 2:
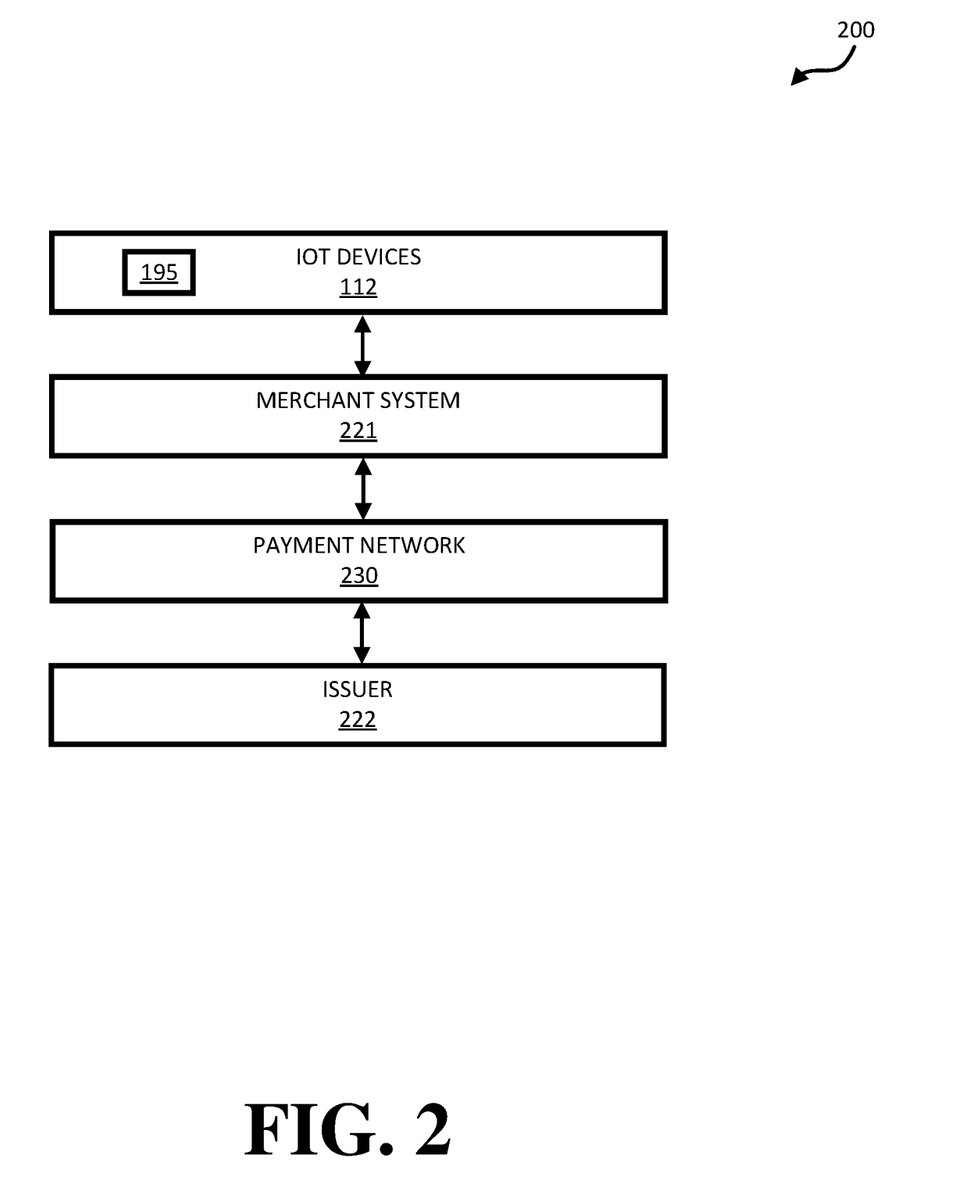
FIG. 2 is a block diagram illustrating a system that utilizes an internet-of-things (IOT) device to generate the transaction-by-proxy in the transaction-by-proxy service of FIG. 1 in accordance with some embodiments.

FIG. 2 illustrates a system 200 in accordance with some embodiments. In some embodiments, the system 200 includes IOT devices 112, a merchant system 221, a payment network 230, and an issuer 222. The system 200 is configured to utilize a transaction-by-proxy application 195 (installed on IOT devices 112) and a transaction-by-proxy model 151 (provided by server 114) to generate a transaction-by-proxy on behalf of user 105. In some embodiments, the transaction-by-proxy is generated without direct verification or approval from user 105, instead, the transaction-by-proxy is generated by transaction-by-proxy application 195 using indirect verification that utilizes the behavior of user 105 that may be received from, for example, transaction-by-proxy application 194 (installed on user device 110), to verify or approve the transaction-by-proxy, in some embodiments, using the transaction-by-proxy services provided by transaction-by-proxy application 195, each IOT device of IOT devices 112 is configured to serve as a proxy for user 105 by generating the transaction-by-proxy that is used to order products or services from merchant system 221.

In some embodiments, transaction-by-proxy application 195 of an IOT device of IOT devices 112 receives the transaction-by-proxy model 151 from server 114 or user device 110 and commences the process of continuously collecting real-time behavior-related data associated with user 105. In some embodiments, transaction-by-proxy application 195 uses the real-time behavior-related data as input to transaction-by-proxy model 151 and generates a transaction-by-proxy request prediction score. In some embodiments, the transaction-by-proxy request prediction score is a prediction indicator of the certainty that a given observation belongs to a positive class (e.g., to request the transaction-by-proxy) or a negative class (e.g., to not request the transaction-by-proxy). In some embodiments, the transaction-by-proxy request prediction score is used to determine whether to request the transaction-by-proxy or to not request the transaction-by-proxy.

In some embodiments, after the transaction-by-proxy request prediction score is generated by transaction-by-proxy application 195, the transaction-by-proxy request prediction score is compared to a transaction-by-proxy request classification threshold to determine whether to initiate the transaction-by-proxy request. In some embodiments, the transaction-by-proxy request classification threshold is a classification threshold that is used to interpret the transaction-by-proxy request prediction score to determine whether to request the transaction-by-proxy or not request the transaction-by-proxy. In some embodiments, when the transaction-by-proxy application 195 determines that the transaction-by-proxy prediction score is not greater than the transaction-by-proxy request classification threshold, the transaction-by-proxy is not requested and transaction-by-proxy application 195 continues to collect behavior-related data associated with user 105 and apply the behavior-related data to transaction-by-proxy model 151. In some embodiments, when the transaction-by-proxy application 195 determines that the transaction-by-proxy request prediction score is greater than the transaction-by-proxy request classification threshold, the transaction-by-proxy application 195 proceeds with determining whether to approve the transaction-by-proxy request.

In some embodiments, in order to determine whether to approve the transaction-by-proxy request, transaction-by-proxy application 195 retrieves a transaction-by-proxy accuracy score and a transaction-by-proxy score time associated with the transaction-by-proxy from transaction-by-proxy unit 197 of server 114. In some embodiments, the transaction-by-proxy accuracy score is a score generated by transaction-by-proxy unit 197 that is used by transaction-by-proxy application 195 to measure the predictive accuracy of the transaction-by-proxy model 151. In some embodiments, transaction-by-proxy unit 197 may use, for example, a binary classification accuracy metric to generate the transaction-by-proxy accuracy score. In some embodiments, the transaction-by-proxy score time is a time generated by transaction-by-proxy unit 107 and provided to transaction-by-proxy application 195 that indicates the moment at which the transaction-by-proxy accuracy score was generated. In some embodiments, a transaction-by-proxy request time is a time generated by transaction-by-proxy application 195 that indicates the moment at which the transaction-by-proxy request occurred. In some embodiments, the transaction-by-proxy accuracy score, the transaction-by-proxy score time, and the transaction-by-proxy request time are all used by transaction-by-proxy application 195 to approve the transaction-by-proxy request as described herein.

In some embodiments, after the transaction-by-proxy accuracy score and the transaction-by-proxy score time are retrieved by transaction-by-proxy application 195, transaction-by-proxy application 195 compares the transaction-by-proxy accuracy score to a transaction-by-proxy accuracy threshold to determine whether the transaction-by-proxy accuracy score meets or does not meet the transaction-by-proxy accuracy threshold. In some embodiments, the transaction-by-proxy accuracy threshold may be set at a value at which a transaction-by-proxy accuracy score above the transaction-by-proxy accuracy threshold indicates that the model is highly accurate and a transaction-by-proxy accuracy score below the transaction-by-proxy threshold indicates that the model is moderately accurate or minimally accurate.

In some embodiments, when the transaction-by-proxy application 195 determines that the transaction-by-proxy accuracy score does not meet the transaction-by-proxy accuracy threshold, the transaction-by-proxy request is not approved and the transaction-by-proxy request is aborted. In some embodiments, when transaction-by-proxy application 195 determines that the transaction-by-proxy accuracy score does meet the transaction-by-proxy accuracy threshold, a request-to-score-time difference between the transaction-by-proxy request time and transaction-by-proxy accuracy score time is calculated by transaction-by-proxy application 195 and the difference is compared to a first transaction-by-proxy time range, a second transaction-by-proxy time range, and a third transaction-by-proxy time range.

In some embodiments, the first transaction-by-proxy time range is a time range indicated by time values greater than a transaction-by-proxy time differential maximum threshold. In some embodiments, the second transaction-by-proxy time range is a time range indicated by time values between the transaction-by-proxy time differential maximum threshold and a transaction-by-proxy time differential minimum threshold. In some embodiments, the third transaction-byproxy time range is a time range indicated by time values below the transaction-by-proxy time differential minimum threshold.

In some embodiments, when the transaction-by-proxy application 195 determines the request-to-score-time difference is above the transaction-by-proxy time differential maximum threshold (e.g., the first transaction-by-proxy time range), the transaction-by-proxy scoring time is considered "not recent" and the transaction is not approved, and the transaction-by-proxy is aborted. In some embodiments, when the transaction-by-proxy application 195 determines the request-score-time difference is above the transaction-by-proxy time differential minimum threshold and below the transaction-by-proxy time differential maximum threshold (i.e., the second transaction-by-proxy time range), the transaction-by-proxy scoring time is considered "moderate" and the consent of user 105 is required to approve the transaction-by-proxy.

In some embodiments, when the transaction-by-proxy application 195 determines the request-score-time difference is below the transaction-by-proxy time differential minimum threshold, the transaction-by-proxy scoring time is considered "very recent" and the transaction is approved. In some embodiments, when the transaction-by-proxy request is approved by transaction-by-proxy application 195, the transaction-by-proxy is provided to merchant system 221 to perform the requested financial transaction (e.g., purchase goods or services using the IOT device as a proxy).

In some embodiments, merchant system 221 receives the transaction-by-proxy from the IOT device of IOT devices 112 and provides the transaction-by-proxy to issuer 222 via payment network 230 for approval or disapproval. In some embodiments, the issuer 222 approves or disapproves the financial transaction following the standard procedures that are typically utilized by payment networks to approve or disapprove of financial transactions. In some embodiments, the payment networks are never made aware that the financial transaction is a transaction-by-proxy. In some embodiments, transaction-by-proxy model 151 is updated with behavior-related data corresponding to the outcome of the transaction-by-proxy and feedback is sent to user 105 to indicate that a transaction-by-proxy has occurred.

Figure 3:
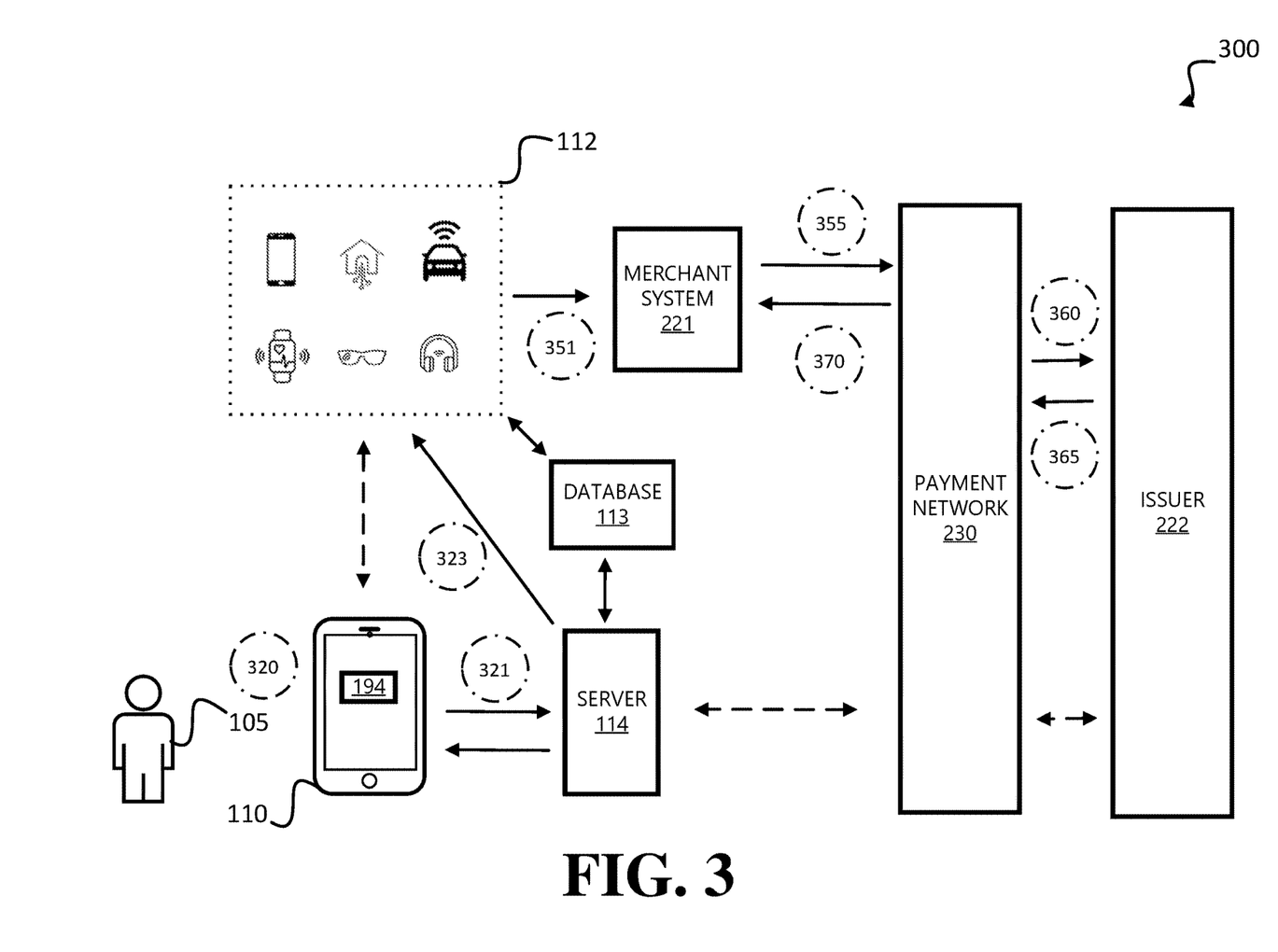
FIG. 3 is an illustration of an exemplary combination system and method for generating a transaction-by-proxy that is used in providing the transaction-by-proxy service of FIG. 1 in accordance with some embodiments.

FIG. 3 is an illustration of an exemplary combination system and method associated with generating a transaction-by-proxy in accordance with some embodiments. In some embodiments, in step 320, the user 105 installs transaction-by-proxy application 194 onto user device 110. In some embodiments, at step 321, user 105 registers user device 110 as a control device and IOT devices 112 as non-control devices with server 114 using the transaction-by-proxy application 194. In some embodiments, at step 323, as part of the registration process, server 114 downloads the transaction-by-proxy application 195 onto the registered IOT devices 112. In some embodiments, at step 351, using a transaction-by-proxy model 151 generated by transaction-by-proxy model generation unit 145 based on behavior-related data collected by transaction-by-proxy application 194 and/or transaction-by-proxy application 195, a registered IOT device of IOT devices 112 provides a transaction-by-proxy to merchant system 221.

In some embodiments, at step 355, the transaction-by-proxy is provided to payment network 230. In some embodiments, at step 360, the transaction-by-proxy is provided to issuer 222 for approval or denial. In some embodiments, at step 365, an approval or denial of the transaction-by-proxy is provided to payment network 230, and subsequently merchant system 221 at step 370. In some embodiments, upon approval of the transaction-by-proxy, the merchandise or service associated with the transaction-by-proxy is provided to user 105. In some embodiments, using the transaction-by-proxy services described herein, the user 105 did not have to individually approve the transaction in order for the merchandise or service associated with the transaction-by-proxy to be provided to user 105.

Figure 4:
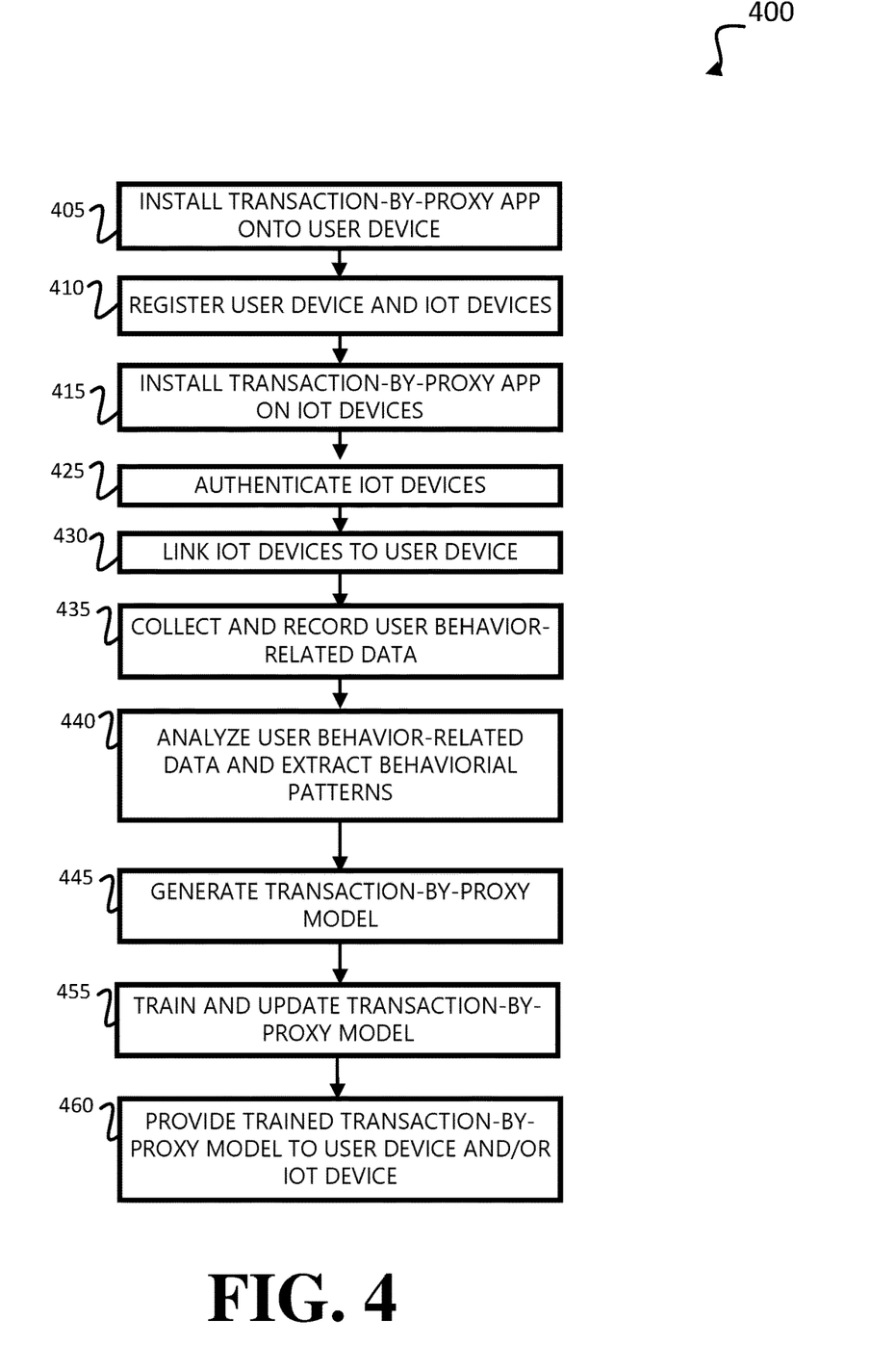
FIG. 4 is a flow diagram illustrating a method for generating the transaction-by-proxy model of FIG. 1 in accordance with some embodiments.

FIG. 4 illustrates a method 400 for generating a transaction-by-proxy model used in the transaction-by-proxy services provided herein in accordance with some embodiments. The method, process steps, or stages illustrated in FIG. 4 may be implemented as an independent routine or process, or as part of a larger routine or process. Note that each process step or stage depicted may be implemented as an apparatus that includes a processor executing a set of instructions, a method, or a system, among other embodiments. In some embodiments, the method 400 is described with reference to FIG. 1-FIG. 3.

In some embodiments, at block 405, transaction-by-proxy application 194 is installed onto user device 110. In some embodiments, as stated previously, in addition to collecting behavior-related information associated with user 105, the transaction-by-proxy application 194 is configured to serve as an access hub for user 105 to utilize the transaction-by-proxy service.

In some embodiments, at block 410, user 105 registers user device 110 and IOT devices 112 with server 114. For example, user 105 registers user device 110 as a control device and IOT devices 112 as non-control devices in the transaction-by-proxy service. In some embodiments, at block 415, transaction-by-proxy application 195 is installed onto registered IOT device/s of IOT devices 112.

In some embodiments, at block 425, IOT devices 112 are authenticated by transaction-by-proxy application 194 of user device 110. In some embodiments, the authentication process may include verification of the registration of IOT devices 112. In some embodiments, at block 430, after the IOT devices 112 are authenticated, the IOT devices 112 are linked to user device 110, via, for example, a Bluetooth, WiFi, or other wireless connection. In some embodiments, at block 435, transaction-by-proxy application 195 and/or transaction-by-proxy application 194 collect and record the behavior of user 105 using user device 110 and/or IOT devices 112.

In some embodiments, at block 440, the behavior patterns of user 105 are extracted from behavior-related data using a transaction-by-proxy analysis. In some embodiments, as part of the transaction-by-proxy analysis, the transaction-by-proxy unit 197 determines whether the behavior-related data is illegitimate user behavior data (e.g., noise) or legitimate user behavior data (e.g., not noise). In some embodiments, when the behavior-related data is legitimate user behavior-related data, the transaction-by-proxy model 151 is updated with new features in the behavior-related data. In some embodiments, when the behavior-related data is not legitimate user behavior-related data; the transaction-by-proxy model 151 is not updated with the features of the behavior-related data and, if already present in the transaction-by-proxy model 151, behavior-related data is removed from the transaction-by-proxy model 151. In some embodiments, at block 445, a transaction-by-proxy model 151 is generated as a result of the transaction-by-proxy analysis that is used transaction-by-proxy application 195 to initiate a transaction-by-proxy. In some embodiments, at block 455, the transaction-by-proxy model is trained and updated based upon the behavior-related data collected by the user device 110 and/or IOT devices 112. In some embodiments, at block 460, the transaction-by-proxy model is provided to user device 110 and/or IOT devices 112 in order to determine whether to initiate a transaction-by-proxy.

Figure 5:
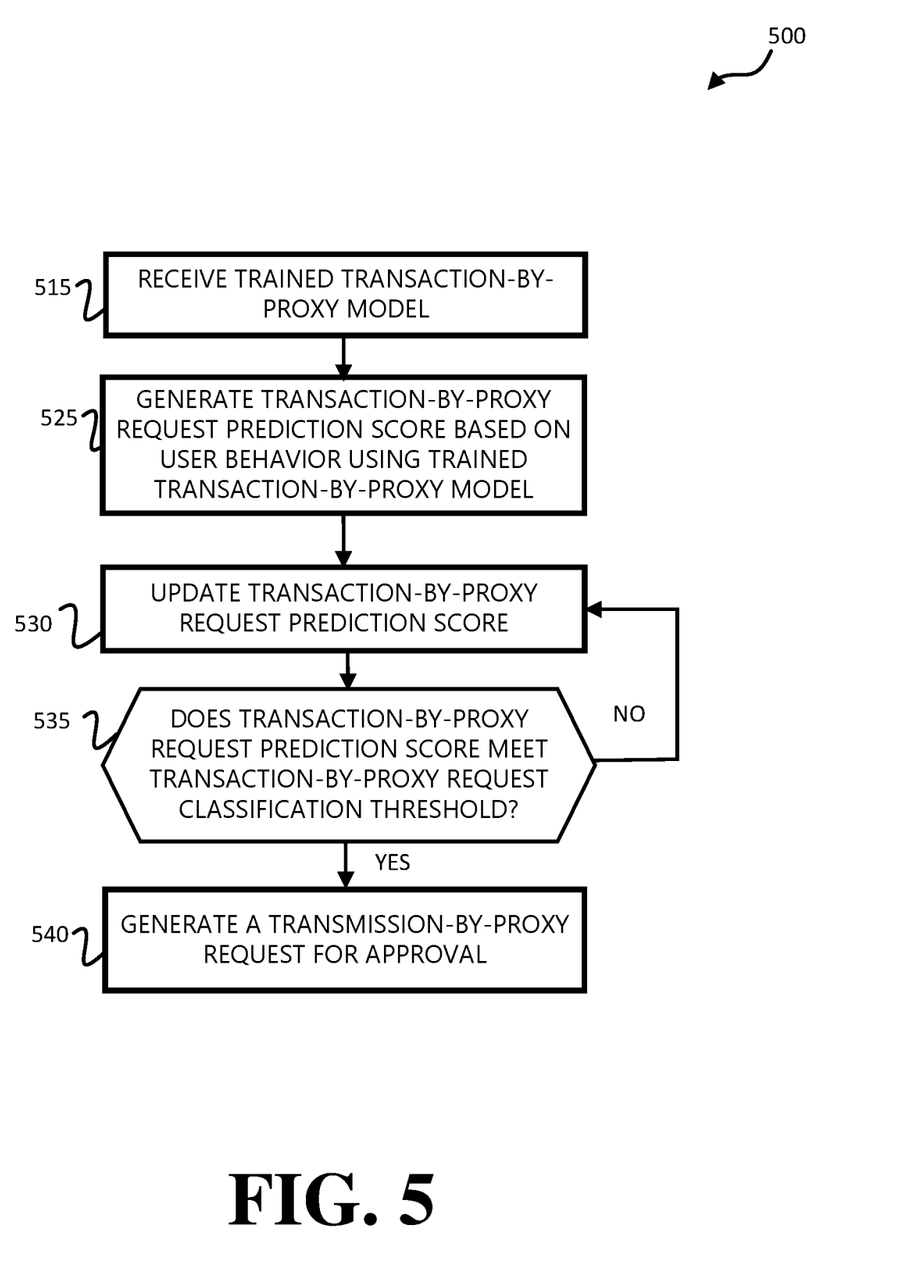
FIG. 5 is a flow diagram illustrating a method for generating a transaction-by-proxy request using the transaction-by-proxy model of FIG. 1 in accordance with some embodiments.

FIG. 5 illustrates a method 500 for generating a transaction-by-proxy-request for approval in accordance with some embodiments. The method, process steps, or stages illustrated in FIG. 5 may be implemented as an independent routine or process, or as part of a larger routine or process. Note that each process step or stage depicted may be implemented as an apparatus that includes a processor executing a set of instructions, a method, or a system, among other embodiments. In some embodiments, the method 500 is described with reference to FIG. 1-FIG. 4.

In some embodiments, at block 515, IOT devices 112 and/or user device 110 receive the transaction-by-proxy model 151 from, for example, server 114. In some embodiments, at block 525, a transaction-by-proxy request prediction score is generated by the transaction-by-proxy application (e.g., transaction-by-proxy application 194 and/or transaction-by-proxy application 195) based on the behavior of user 105 (e.g., behavior-related data) using a trained transaction-by-proxy model 151. In some embodiments, at block 530, the transaction-by-proxy request prediction score is updated with the newly generated transaction-by-proxy request prediction score. In some embodiments, at block 535, the transaction-by-proxy application determines whether the transaction-by-proxy request prediction score meets a transaction-by-proxy request classification threshold.

In some embodiments, at block 535, when the transaction-by-proxy application determines the transaction-by-proxy request prediction score does not meet the transaction-by-proxy request classification threshold, the transaction-by-proxy request is not yet assessed for approval and the method feeds back to block 530. In some embodiments, at block 540, when the transaction-by-proxy application determines the transaction-by-proxy request prediction score does meet the transaction-by-proxy request classification threshold at block 535, the transaction-by-proxy request is submitted for approval as described with reference to FIG. 6.

Figure 6:
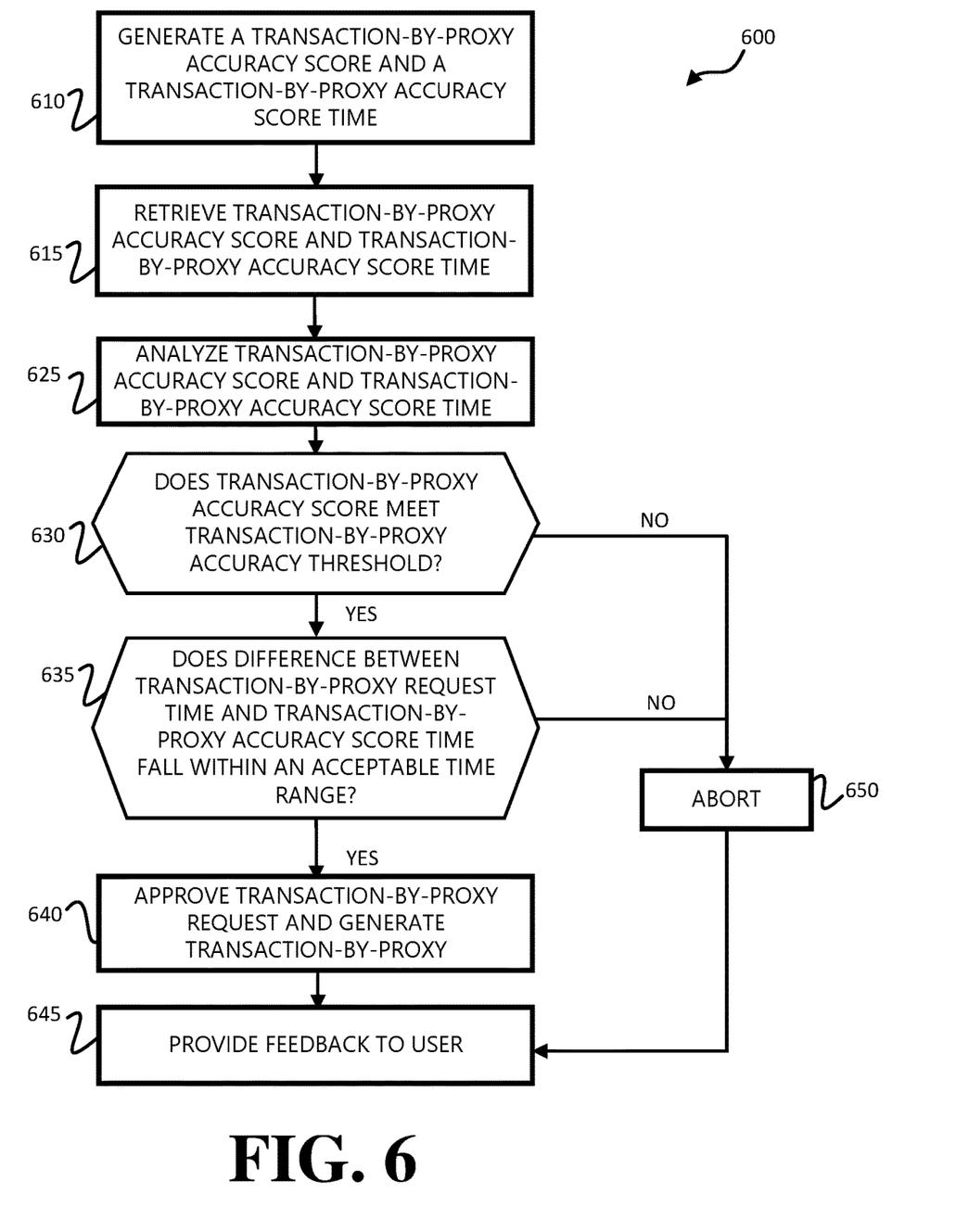
FIG. 6 is a flow diagram illustrating a method for approving the transaction-by-proxy request of FIG. 3 in accordance with some embodiments.

FIG. 6 illustrates a method 600 for determining whether to approve a transaction-by-proxy request in accordance with some embodiments. The method, process steps, or stages illustrated in FIG. 6 may be implemented as an independent routine or process, or as part of a larger routine or process. Note that each process step or stage depicted may be implemented as an apparatus that includes a processor executing a set of instructions, a method, or a system, among other embodiments. In some embodiments, the method 600 is described with reference to FIG. 1-FIG. 5.

In some embodiments, at block 610, a transaction-by-proxy accuracy score and a transaction-by-proxy accuracy score time is generated by, for example, transaction-by-proxy unit 197 of server 114. In some embodiments, at block 615, after the transaction-by-proxy accuracy score and the transaction-by-proxy accuracy score time are generated by the transaction-by-proxy unit 197 at block 610, transaction-by-proxy application (e.g., transaction-by-proxy application 194 and/or transaction-by-proxy application 195) retrieves the transaction-by-proxy accuracy score and the transaction-by-proxy accuracy score time associated with the transaction-by-proxy accuracy score from transaction-by-proxy unit 197. In some embodiments, at block 625, the transaction-by-proxy application analyzes the transaction-by-proxy accuracy score and the transaction-by-proxy accuracy score time. In some embodiments, at block 630, the transaction-by-proxy application determines whether the transaction-by-proxy accuracy score meets a transaction-by-proxy accuracy threshold.

In some embodiments, at block 650, when the transaction-by-proxy accuracy score does not meet the transaction-by-proxy accuracy threshold, the transaction-by-proxy request is not approved and the transaction-by-proxy request is aborted. In some embodiments, at block 635, when the transaction-by-proxy accuracy score does meet the transaction-by-proxy accuracy threshold, a difference between a transaction-by-proxy request time and a transaction-by-proxy accuracy score time (e.g., a request-score time difference) is assessed to determine whether the request-score time difference falls within an acceptable time range. In some embodiments, at block 640, when the request-score time difference does not fall within an acceptable time range, the transaction-by-proxy request is aborted. In some embodiments, at block 640, when the request-score time difference falls within an acceptable time range, the transaction-by-proxy request is approved and the transaction-by-proxy is generated and transmitted to the merchant system 221 for the purchase of goods or services. In some embodiments, at block 645, after the transaction-by-proxy request is approved at block 640 and after the transaction-by-proxy is aborted at block 650, feedback is sent to user 105 to indicate that a transaction-by-proxy has occurred or has not occurred and the transaction-by-model is updated accordingly.

Figure 7:
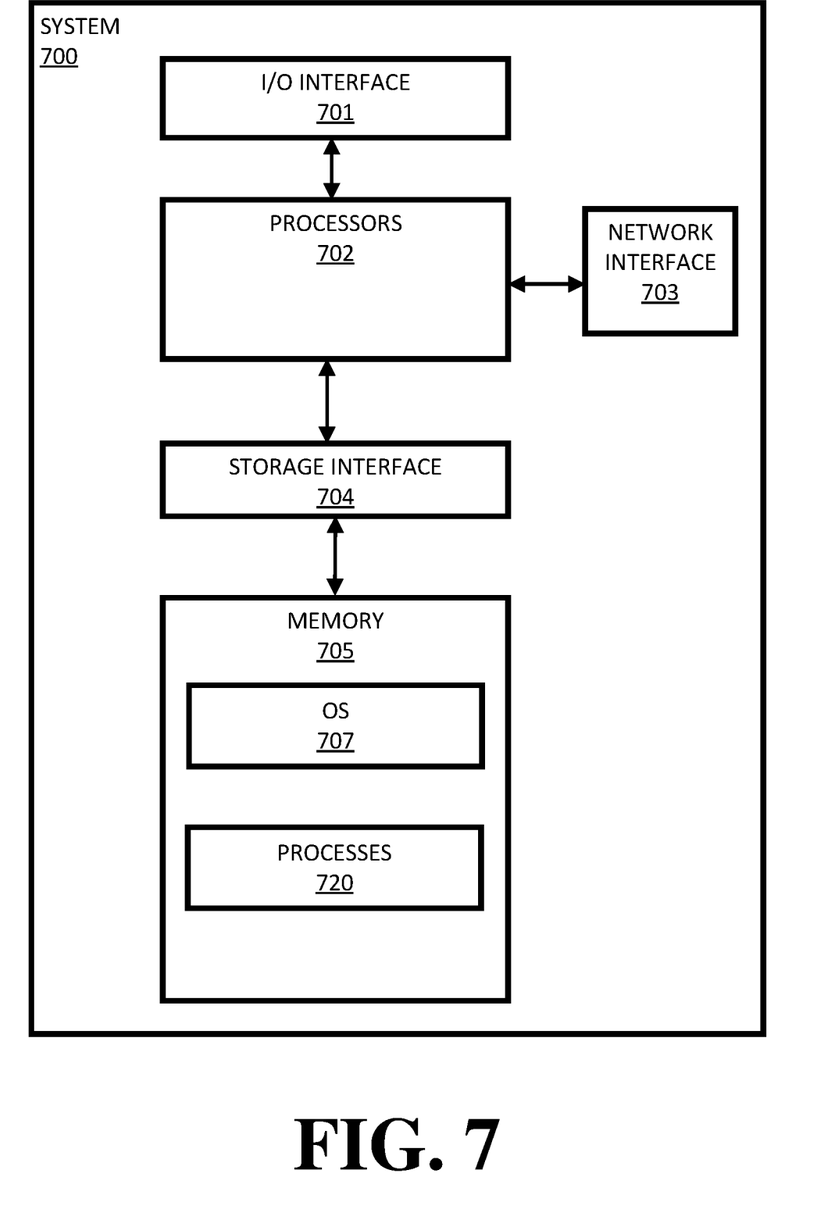
FIG. 7 is an exemplary system used to generate a transaction-by-proxy in accordance with some embodiments.

FIG. 7 illustrates a block diagram of an exemplary system 700 for implementing embodiments consistent with the present disclosure. In some nonlimiting embodiments or aspects, the system 700 may utilize a transaction-by-proxy service to implement a method for generating a transaction-by-proxy on behalf of user 105. In some embodiments, the system may be, for example, an IOT device. In some embodiments, a processor 702 may comprise at least one data processor for executing program components for dynamic resource allocation at run time. The processor 702 may include specialized processing units such as integrated system (bus) controllers, memory management control units, floating point units, graphics processing units, digital signal processing units, etc.

In some embodiments, the processors 702 may be disposed in communication with one or more input/output (I/O) devices (not shown) via an I/O interface 701. The I/O interface 701 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMi), RF antennas, S-Video, VGA, IEEE 802.1 n/b/g/n/x, Bluetooth®, cellular (e.g., code-division multiple access (CDMA), high-speed packet access (HSPA+), global system for mobile communications (GSM), long-term evolution (LTE), WiMax®, or the like), etc.

In some embodiments, using the I/O interface 701, the system 700 may communicate with one or more I/O devices. For example, an input device 710 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. An output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the processors 702 may be disposed in communication with the communication network via a network interface 703. The network interface 703 may communicate with the communication network. The network interface 703 may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network may include, without limitation, a direct interconnection, e-commerce network, a peer to peer (P2P) network, local area network (LAN), wide area network (WAN), wireless network (e.g., using Wireless Application Protocol), the internet, Wi-Fi®, etc. Using the network interface 703) and the communication network, the system 700 may communicate with the one or more service operators.

In some non-limiting embodiments or aspects, the processors 702 may be disposed in communication with a memory 705 (e.g., RAM, ROM, etc. not shown in FIG. 7 via a storage interface 704. In some embodiments, the storage interface 704 may connect to memory 705 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems interface (SCSI), etc. The memory drives may further include a drum, magnetic disc drive, magneto-optical drive, optical drive, Redundant Array of Independent Discs (RAID), solid-state memory devices, solid-state drives, etc.

In some embodiments, the memory 705 may store a collection of program or database components, including, without limitation, a user interface 706, an operating system 707, a web server, etc. In some non-limiting embodiments or aspects, the system 700 may store user/application data, such as the data, variables, records, etc. as described in this disclosure. Such databases may be implemented as fault-tolerant, relational, scalable, secure databases such as Oracle or Sybase.

In some embodiments, the operating system 707 may facilitate resource management and operation of the system 700. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® OS®, GOOGLE™ ANDROID™, BLACKBERRY® OS, or the like.

In some non-limiting embodiments or aspects, the system 700 may implement a web browser (not shown in the figures) stored program component. The web browser (not shown in the figures) may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers may utilize facilities such as AJAX, DHTML, ADOBE® FLASH®, JAVASCRIPT®, JAVA®, Application Programming Interfaces (APIs), etc.

Furthermore, one or more computer-readable storage media may be utilized in implementing embodiments consistent with the present disclosure. In some embodiments, a computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, e.g., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

In some embodiments, a computer-implemented method, includes registering a user device and a first internet-of-things (IOT) device for use in a transaction-by-proxy service; collecting behavior-related data associated with a user of the user device and the first IOT device; and using the behavior-related data as part of the transaction-by-proxy service to generate a transaction-by-proxy at the first IOT device on behalf of the user of the user device.

In some embodiments, the computer-implemented method further includes generating a transaction-by-proxy model using the behavior-related data associated with the user.

In some embodiments, the computer-implemented method further includes training the transaction-by-proxy model to determine whether to generate a request for the transaction-by-proxy.

In some embodiments of the computer-implemented method, the transaction-by-proxy generated using the transaction-by-proxy service does not require the user of the user device to give authorization during the generation of the transaction-by-proxy.

In some embodiments, the computer-implemented method further includes generating a transaction-by-proxy request prediction score to determine whether to generate the request for the transaction-by-proxy.

In some embodiments of the computer-implemented method, in order to determine whether to generate the request for the transaction-by-proxy, the transaction-by-proxy request prediction score is compared to a transaction-by-proxy request classification threshold.

In some embodiments of the computer-implemented method, in order to determine whether to approve the request for the transaction-by-proxy, a transaction-by-proxy accuracy score is compared to a transaction-by-proxy accuracy threshold.

In some embodiments of the computer-implemented method, in addition to using the transaction-by-proxy accuracy score to approve the request for the transaction-by-proxy, a transaction-by-proxy request time associated with the request for the transaction-by-proxy is used to approve the request for the transaction-by-proxy.

In some embodiments of the computer-implemented method, a difference between the transaction-by-proxy request time and a transaction-by-proxy accuracy score is used to approve the request for the transaction-by-proxy.

In some embodiments of the computer-implemented method, the transaction-by-proxy generated using the transaction-by-proxy service includes making a payment for a service or product provided as a result of the approval of the request for the transaction-by-proxy.

In some embodiments, an internet-of-things (IOT) device includes a processor; and a non-transitory computer readable medium coupled to the processor, the non-transitory computer readable medium comprising code, that when executed by the processor, causes the processor to: collect behavior-related data associated with a user of the IOT device; and use the behavior-related data to generate a transaction-by-proxy at the IOT device on behalf of the user of the IOT device.

In some embodiments of the IOT device, wherein the code, when executed by the processor, further causes the processor to: utilize a transaction-by-proxy model that is generated using the behavior-related data associated with the user.

In some embodiments of the IOT device, the transaction-by-proxy model is trained to determine whether to generate a request for the transaction-by-proxy.

In some embodiments of the IOT device, the code, when executed by the processor, further causes the processor to: generate a transaction-by-proxy request prediction score to determine whether to generate the request for the transaction-by-proxy.

In some embodiments of the IOT device, the code, when executed by the processor, further causes the processor to: compare the transaction-by-proxy request prediction score to a transaction-by-proxy request classification threshold in order to determine whether to generate the request the transaction-by-proxy.

In some embodiments of the IOT device, the code, when executed by the processor, further causes the processor to: compare a transaction-by-proxy accuracy score to a transaction-by-proxy accuracy threshold to determine whether to approve the request for the transaction-by-proxy.

In some embodiments of the IOT device, the code, when executed by the processor, further causes the processor to: use a transaction-by-proxy accuracy score time and a transaction-by-proxy request time to approve the request for the transaction-by-proxy.

In some embodiments, a system includes a transaction-by-proxy model generation unit; and a transaction-by-proxy generator coupled to the transaction-by-proxy model generation unit, wherein a transaction-by-proxy application located at the transaction-by-proxy generator is configured to use a transaction-by-proxy model generated by the transaction-by-proxy model generation unit to initiate a transaction-by-proxy on behalf of the user.

In some embodiments of the system, the transaction-by-proxy application generates a transaction-by-proxy accuracy score that is used to determine whether to approve a request for the transaction-by-proxy.

In some embodiments of the system, the transaction-by-proxy accuracy score is compared to a transaction-by-proxy accuracy threshold to determine whether to approve the request for the transaction-by-proxy.

What is claimed is:

1. A computer-implemented method, comprising:
   registering a user device and a first internet-of-things (IOT) device for use in a transaction-by-proxy service;
   configuring the user device to control the first IOT device by utilizing the registration of the user device as a control device and the registration of the IOT device as non-control device;
   utilizing a device identifier and an application programming interface identifier for each device during the registration of the user device and the first IOT device;
   collecting behavior-related data associated with a user of the user device and the first IOT device;
   generating an access hub for the user to utilize the transaction-by-proxy service, the access hub being configured to allow the user to access and control the transaction-by-proxy service; and
   using the behavior-related data as part of the transaction-by-proxy service to generate a transaction-by-proxy at the first IOT device on behalf of the user of the user device, wherein in order to determine whether to approve a request for the transaction-by-proxy, a transaction-by-proxy accuracy score is compared to a transaction-by-proxy accuracy threshold.

2. The computer-implemented method of claim 1, further comprising:
   generating a transaction-by-proxy model using the behavior-related data associated with the user.

3. The computer-implemented method of claim 2, further comprising:
   training the transaction-by-proxy model to determine whether to generate a request for the transaction-by-proxy.

4. The computer-implemented method of claim 3, wherein:
   the transaction-by-proxy generated using the transaction-by-proxy service does not require the user of the user device to give authorization during the generation of the transaction-by-proxy.

5. The computer-implemented method of claim 4, further comprising:
   generating a transaction-by-proxy request prediction score to determine whether to generate the request for the transaction-by-proxy.

6. The computer-implemented method of claim 5, wherein:
   in order to determine whether to generate the request for the transaction-by-proxy, the transaction-by-proxy request prediction score is compared to a transaction-by-proxy request classification threshold.

7. The computer-implemented method of claim 6, wherein:
   in addition to using the transaction-by-proxy accuracy score to approve the request for the transaction-by-proxy, a transaction-by-proxy request time associated with the request for the transaction-by-proxy is used to approve the request for the transaction-by-proxy.

8. The computer-implemented method of claim 7, wherein:
   a difference between the transaction-by-proxy request time and a transaction-by-proxy accuracy score is used to approve the request for the transaction-by-proxy.

9. The computer-implemented method of claim 8, wherein:
   the transaction-by-proxy generated using the transaction-by-proxy service includes making a payment for a service or product provided as a result of the approval of the request for the transaction-by-proxy.

10. An internet-of-things device, comprising:
    a processor; and
    a non-transitory computer readable medium coupled to the processor, the non-transitory computer readable medium comprising code, that when executed by the processor, causes the processor to:
    collect behavior-related data associated with a user of the IOT device, the user being associated with a user device and the IOT device, the user device being configured to control the IOT device by utilizing a registration of the user device as a control device and a registration of the IOT device as a non-control device, wherein a device identifier and an application programming interface identifier are utilized for each device during the registration of the user device and the first IOT device;
    utilize an access hub generated for the user to utilize the transaction-by-proxy service, the access hub being configured to allow the user to access and control the transaction-by-proxy service;

use the behavior-related data to generate a transaction-by-proxy at the IOT device on behalf of the user of the IOT device; and compare a transaction-by-proxy accuracy score to a transaction-by-proxy accuracy threshold to determine whether to approve the request for the transaction-by-proxy.

11. The IOT device of claim 10, wherein the code, when executed by the processor, further causes the processor to:

utilize a transaction-by-proxy model that is generated using the behavior-related data associated with the user.

12. The IOT device of claim 11, wherein:

the transaction-by-proxy model is trained to determine whether to generate a request for the transaction-by-proxy.

13. The IOT device of claim 12, wherein the code, when executed by the processor, further causes the processor to:

generate a transaction-by-proxy request prediction score to determine whether to generate the request for the transaction-by-proxy.

14. The IOT device of claim 13, wherein the code, when executed by the processor, further causes the processor to:

compare the transaction-by-proxy request prediction score to a transaction-by-proxy request classification threshold in order to determine whether to generate the request the transaction-by-proxy.

15. An internet-of-things device, comprising:

a processor; and a non-transitory computer readable medium coupled to the processor, the non-transitory computer readable medium comprising code, that when executed by the processor, causes the processor to:

collect behavior-related data associated with a user of the IOT device, the user being associated with a user device and the IOT device, the user device being configured to control the IOT device by utilizing a registration of the user device as a control device and a registration of the IOT device as a non-control device, wherein a device identifier and an application programming interface identifier are utilized for each device during the registration of the user device and the first IOT device;

utilize an access hub generated for the user to utilize the transaction-by-proxy service, the access hub being configured to allow the user to access and control the transaction-by-proxy service;

use the behavior-related data to generate a transaction-by-proxy at the IOT device on behalf of the user of the IOT device;

utilize a transaction-by-proxy model that is generated using the behavior-related data associated with the user, wherein the transaction-by-proxy model is trained to determine whether to generate a request for the transaction-by-proxy;

generate a transaction-by-proxy request prediction score to determine whether to generate the request for the transaction-by-proxy;

compare the transaction-by-proxy request prediction score to a transaction-by-proxy request classification threshold in order to determine whether to generate the request the transaction-by-proxy;

compare a transaction-by-proxy accuracy score to a transaction-by-proxy accuracy threshold to determine whether to approve the request for the transaction-by-proxy.

16. The IOT device of claim 15, wherein the code, when executed by the processor, further causes the processor to:

use a transaction-by-proxy accuracy score time and a transaction-by-proxy request time to approve the request for the transaction-by-proxy.

* * * * *